(12) United States Patent
Ogawa

(10) Patent No.: US 7,055,798 B2
(45) Date of Patent: Jun. 6, 2006

(54) PROPORTIONAL SOLENOID CONTROL VALVE

(75) Inventor: Osamu Ogawa, Kyotanabe (JP)

(73) Assignee: Kojima Instruments Inc., Kyoto (JP)

( * ) Notice: Subject to any disclaimer, the term of this patent is extended or adjusted under 35 U.S.C. 154(b) by 169 days.

(21) Appl. No.: 10/772,259

(22) Filed: Feb. 6, 2004

(65) Prior Publication Data

US 2005/0173664 A1    Aug. 11, 2005

(51) Int. Cl.
*F16K 31/02* (2006.01)
(52) U.S. Cl. .................... 251/129.08; 251/129.19; 251/337
(58) Field of Classification Search ........... 251/129.08, 251/129.19, 337
See application file for complete search history.

(56) References Cited

U.S. PATENT DOCUMENTS

| 4,085,921 | A | * | 4/1978 | Ueda et al. ............ 251/129.08 |
| 4,732,362 | A | * | 3/1988 | Morioka et al. ....... 251/129.17 |
| 4,890,815 | A | * | 1/1990 | Hascher-Reichl et al. ........ 251/129.15 |
| 4,930,747 | A | * | 6/1990 | Nakamura ............ 251/129.17 |
| 5,232,196 | A |   | 8/1993 | Hutchings et al. |
| 6,073,908 | A | * | 6/2000 | Koga et al. ................. 251/337 |
| 6,220,569 | B1 | * | 4/2001 | Kelly ..................... 251/129.08 |
| 6,336,621 | B1 | * | 1/2002 | Ii et al. .................. 251/129.15 |

* cited by examiner

*Primary Examiner*—John Bastianelli
(74) *Attorney, Agent, or Firm*—Global IP Counselors

(57) ABSTRACT

A proportional solenoid control valve comprises a flat square spring which is wide in maintaining width with respect to displacement of a spring having a greater spring constant, so that accurate control of fluid is realized. The flat square spring has four tubs and is supported with respect to a step face with outer peripheral section thereof. The valve further comprises a sealing mechanism loaded with rubber resilience compensates instability of armature construction and resilient sealing section. The spring constant of the flat square spring is improved by strengthening the magnetic force, thus hysteresis can be made to be smaller.

2 Claims, 5 Drawing Sheets

PROPORTIONAL SOLENOID CONTROL VALVE

FIELD OF THE INVENTION

The present invention relates to a proportional solenoid control valve. More particularly, the present invention relates to a proportional solenoid control valve for controlling flow rate of fluid with accuracy.

BACKGROUND OF THE INVENTION

A proportional solenoid control valve is generally disclosed in U.S. Pat. No. 5,232,196. U.S. Pat. No. 5,232,196 generally discloses an improved arrangement for a proportional solenoid valve for controlling a flow rate with accuracy.

In such proportional solenoid control valve, if magnetic force is weaker, unstable element for controlling is generated such as frictional thread engagement, affection due to inlet pressure and outlet pressure.

In a proportional solenoid valve a displacement is determined based upon power balancing of a attracting magnetic force and a repulsion force, the attracting magnetic force being a force for attracting a magnetic rod and a plunger to one another by a magnetic field generated from a solenoid coil, the repulsion force being due to the displacement of a spring.

When a controlling voltage is changed, an attracting magnetic force is changed, a balancing displacement of a flat spring is changed, so that a flow rate is controlled by a movement of a plunger.

When a magnetic force is made stronger by restoring turbulence in atomic array due to processing surface distortion by employing cylindrical magnetic yoke and magnetic washer by making its size smaller and enlarging magnetic cross sectional area, and when a magnetic flux density is smaller than saturation region by increasing a spring constant of a flat spring for power balancing, hysteresis becomes smaller, affection of a primary side pressure and a secondary side pressure for a flow rate becomes smaller so that stable controlling is realized.

DISCLOSURE OF THE INVENTION

The present invention provides a dimensional stable sealing mechanism by employing a rubber having a smaller hardness and a rubber sheet having a greater hardness for a portion corresponding to an orifice as the sealing mechanism which has a smaller movement.

It is an object of the present invention to provide a stable controlling proportional valve having a smaller hysteresis, no frictional thread engagement of a plunger by making a magnetic force of a solenoid coil greater, smaller affection of a primary side pressure and a secondary side pressure for an opening of a valve, and no vibration affection due to friction of a supporting point of a flat spring by arranging a dimensional stable sealing mechanism and.

A proportional flow rate control valve according to the present invention is applied a controlling voltage to a solenoid coil located at coax thereto, a control current flows therethrough, the magnetic force proportional to the controlling voltage and a flat spring balance in force, thereby a valve sealing mechanism connected to the plunger axis moves so as to control a flow rate of fluid.

The flat spring may be a circular flat spring having a circular shape and cutouts each provided at one of four positions along a circumference towards its center which circular flat spring does not change a distance between supporting points regardless of changing in load. The flat spring may be designed to be a flat square spring having an annular square shape, coating of low friction TEFLON on a supporting point side face, cutouts each provided at one of four corners of inner periphery having a uniform width. Thus the flat spring is designed to have a spring constant which is maintained constant with respect to a spring displacement and have a wider movable extent.

The flat spring has four tabs at four corners in its outer periphery. Its outer peripheral portions coated with TEFLON are pressure contacted towards step portions of a valve main body.

A magnetic flux passage has a magnetic gap. When a magnetic cross sectional area is increased and when the spring constant of the flat spring is increased by strengthening the magnetic force of the solenoid coil by disposing magnetic washers at both ends thereof, the magnetic hysteresis becomes smaller, affection of the primary fluid pressure and the second fluid pressure to the opening of the valve also becomes smaller, thus more superior proportional controlling of fluid becomes possible.

When the magnetic force is increased, the affection of frictional thread engagement of the plunger against an inner face of a housing of a plunger becomes smaller thus the controllability is improved.

The plunger has a rubber load sealing arrangement having a smaller hardness at the end thereof.

This sealing mechanism requires a slight little stroke. Thus, a combination of a rubber load having a smaller hardness and a rubber seal having a greater hardness for a face corresponding to an orifice compensates a dimensional instable configuration.

The inventor intends to enlarge deformation limit of spring span so as to be a spring shape for obtaining a constant spring constant for a stroke extent of a flat spring.

The inventor also intends to employ flat spring having a square shape, and having cutouts at inner side of four corners, and having TEFLON coating with smaller friction coefficient on one side, or to employ a circular flat spring with no change in distance between supporting points.

The inventor also intends to employ a flat square spring having tubs at four corners.

The inventor further intends to enlarge cross sectional area of magnetic flux passage by employing a magnetic washer and cylindrical magnetic yoke, and to remove machining distortion by annealing.

The invention further intends to make hysteresis smaller and to improve controllability by strengthening magnetic force by not entering magnetic density into saturation region.

The proportional solenoid control valve provides stable control having continuity in which flow rate is not changed due to vibration without dead zone by employing a flat square spring or circular flat spring. The flat square spring obtains uniform deformation displacement, and is strong and is wide in spring constant maintaining width with respect to the spring displacement, and is applied low friction Teflon coating on one supporting point side face. The circular flat spring having distance between the supporting points which does not change even when the load has changed.

The flat square spring has four tabs and is supported at a low friction outer peripheral section which is obtained by applying TEFLON coating to a stepped face.

A sealing mechanism loaded by a rubber having a smaller hardness compensates dimensional instability using combination of armature arrangement and rubber chip sealing section having a greater hardness.

A cross sectional area of a magnetic passage is made to be greater by employing a cylindrical magnetic yoke, magnetic leaves A and B. A machined surface is applied annealing processing. Thus, atomic array turbulence, magnetic induction obstruction due to inner distortion by processing such as sheet metal bending are removed so that a magnetic force can be made to be stronger and a spring constant of the flat square spring can be made to be greater.

The change in flow rate due to vibration generated from supporting point friction is eliminated by employing the flat square spring applied low friction TEFLON coating on one supporting point side face thereof or by employing the circular flat spring having a distance between supporting points which does not change.

Magnetic hysteresis can be made to be smaller by maintaining magnetic body gap within the extent not for lowering magnetic flux density so that the magnetic flux is equal to or less than magnetic flux saturation region.

BRIEF DESCRIPTION OF AN EMBODIMENT OF THE INVENTION

Figure 1:
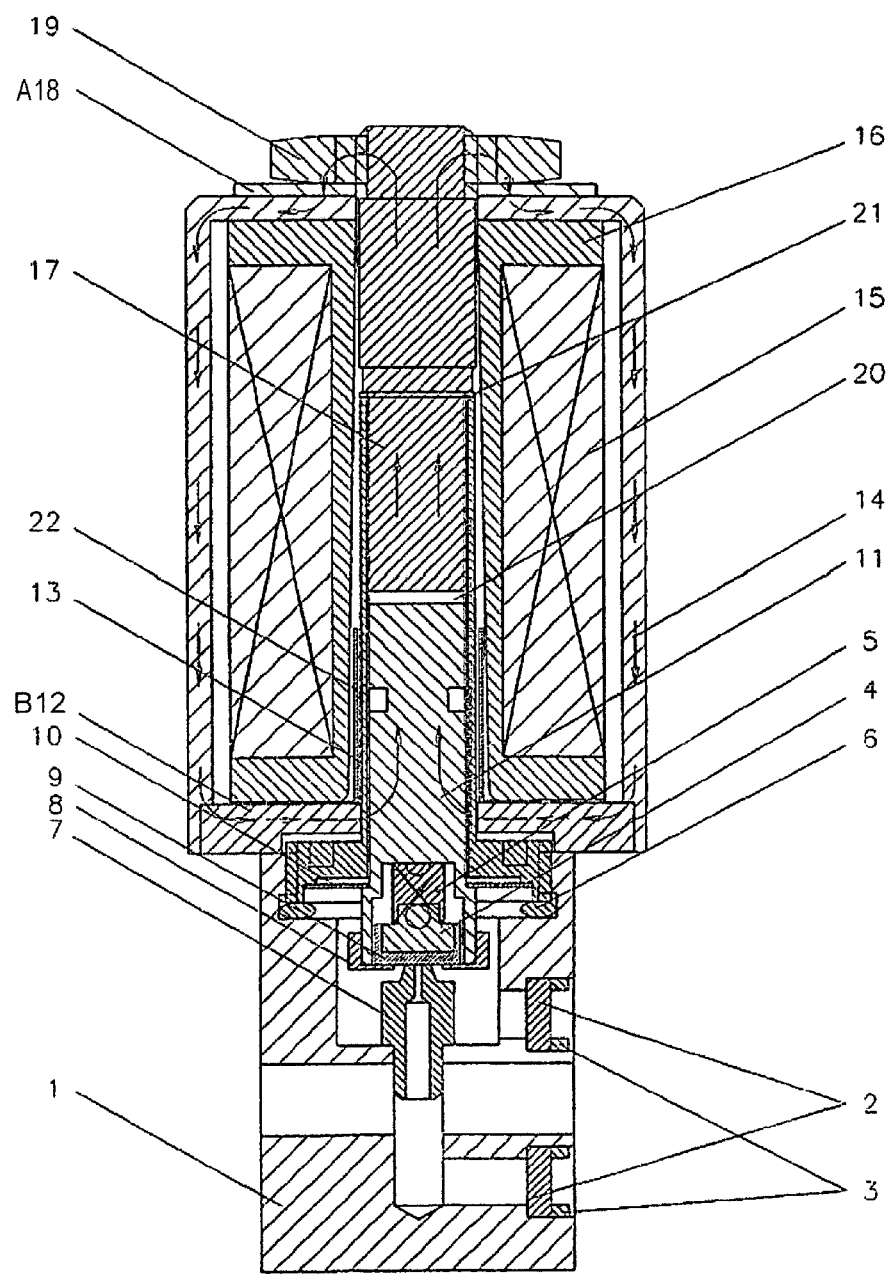
FIG. 1 is a vertical cross sectional view of a proportional solenoid control valve of an embodiment according to the present invention.

Referring to FIG. 1, a vertical cross sectional view of a proportional solenoid control valve of an embodiment according to the present invention is illustrated.

In the proportional solenoid control valve, a magnetic wiring (magnetic coil) 15 is applied to a hollow wiring bobbin 16, and a plunger housing 13, a magnetic rod 17 and a plunger 11, the wiring bobbin 16, and a magnetic assistance sleeve 22 are located coaxially.

A magnetic yoke 14 has a cylindrical shape. The magnetic rod 17, the plunger housing 13, the wiring bobbin 16, and the magnetic assistance sleeve 22 are located coaxially within the interior of the yoke 14.

A circular magnetic nut 19 is used to screwing-lock the magnetic rod 17 by interposing a magnetic washer A18 so as to be fixed to the plunger housing 13 by interposing the magnetic coil 15, wiring bobbin 16, the circular shaped magnetic yoke 14, and a magnetic washer B12.

The plunger housing or non-magnetic cylindrical member 13 has a cylindrical shape, and is located in the interior of a central hole of a valve main body. The plunger housing 13 has a plunger 11.

The plunger housing 13 is applied thread cutting at its edge face, and is screw fixed to a base block 1.

The magnetic rod 17 is connected by welding 21 to a brass section of the plunger housing 13, the brass section being at an end face opposite to the thread cutting.

An orifice 7 of the valve is provided at the central section of the base block 1, thus an inlet for flowing fluid into and an outlet for flowing fluid out are provided.

In the inlet and outlet, a SUS304 sintered metal filter 2 and a filter fixing metal ring 3 are fixed by press fitting so that dust is prevented from entering.

An O-ring 6 is provided between the plunger housing 13 and the connection section of the base block 1 for preventing outward leaking of fluid from occurrence.

A flat square spring 10 with its supporting point side face coated with low friction TEFLON or a circular flat spring 10 with a constant distance between supporting points is pressed to an inner step section of the plunger housing 13 and to an outer step section of the plunger 11. The inner step section of the plunger housing 13 is a step by 250 μm so as to limit a movable amount of the plunger 11.

A load sealing tip 4 pressed by a cylindrical elastic rubber 5 is provided at poppet section, a cylindrical inner hole of the plunger 11, and is cushioned and semi-fixed by pressure engaging a plunger cap 8 with the outer periphery.

The load sealing tip 4 is made by baking the elastic rubber 9 having greater hardness on a metallic circular disc, and the elastic rubber 9 is pressed against the orifice 7 by the cylindrical elastic rubber 5 having a smaller elastic coefficient by interposing the load sealing tip 4. A required stroke amount of the load sealing tip 4 is equal to or less than 80 μm.

The flat square spring or circular flat spring 10, orifice 7 and valve main body are made of non-magnetic material, while the plunger 11, magnetic rod 17, magnetic yoke 14, magnetic washers A18 and B12, and circular magnetic nut 19 are made of magnetic material.

Figure 2:
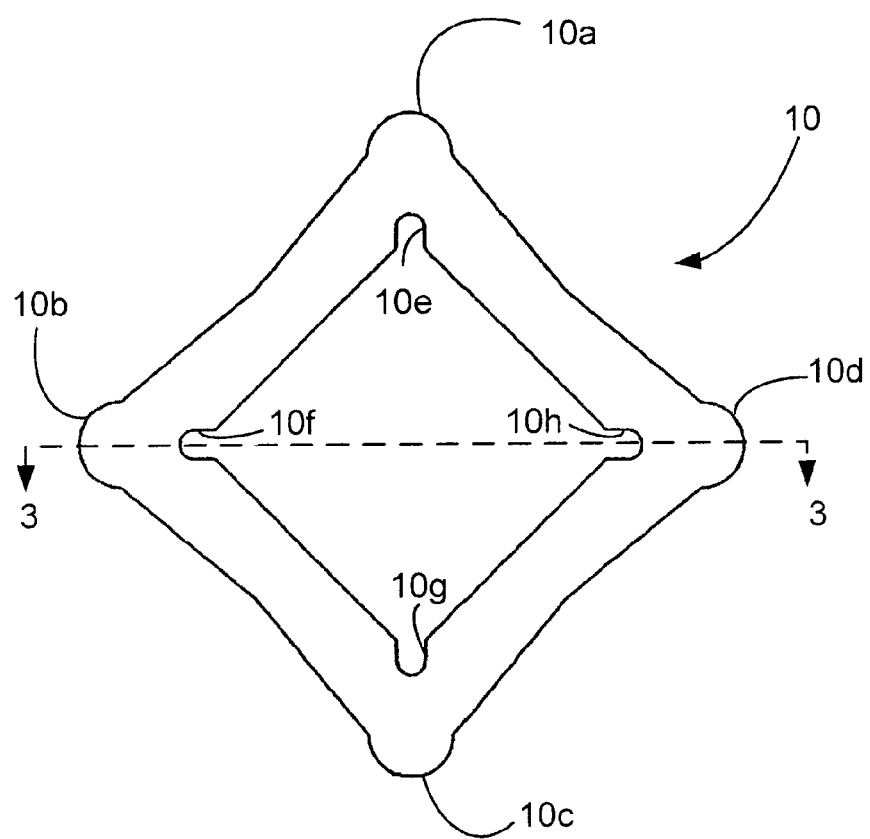
FIG. 2 is a top view of a flat square spring of the proportional solenoid control valve.
Figure 3:
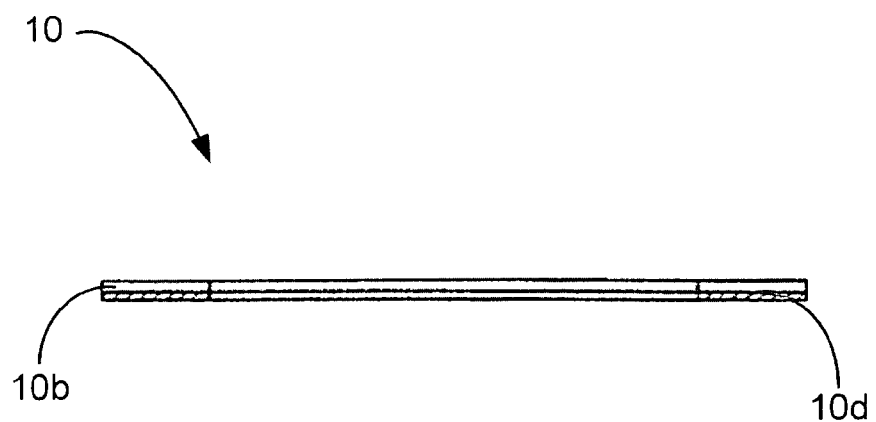
FIG. 3 is a vertical cross sectional view of a flat spring of the proportional solenoid control valve.

FIG. 2 shows a top view of the flat square spring 10 with low friction TEFLON coating on its supporting point side face, while FIG. 3 shows a cross sectional view of the same.

Figure 4:
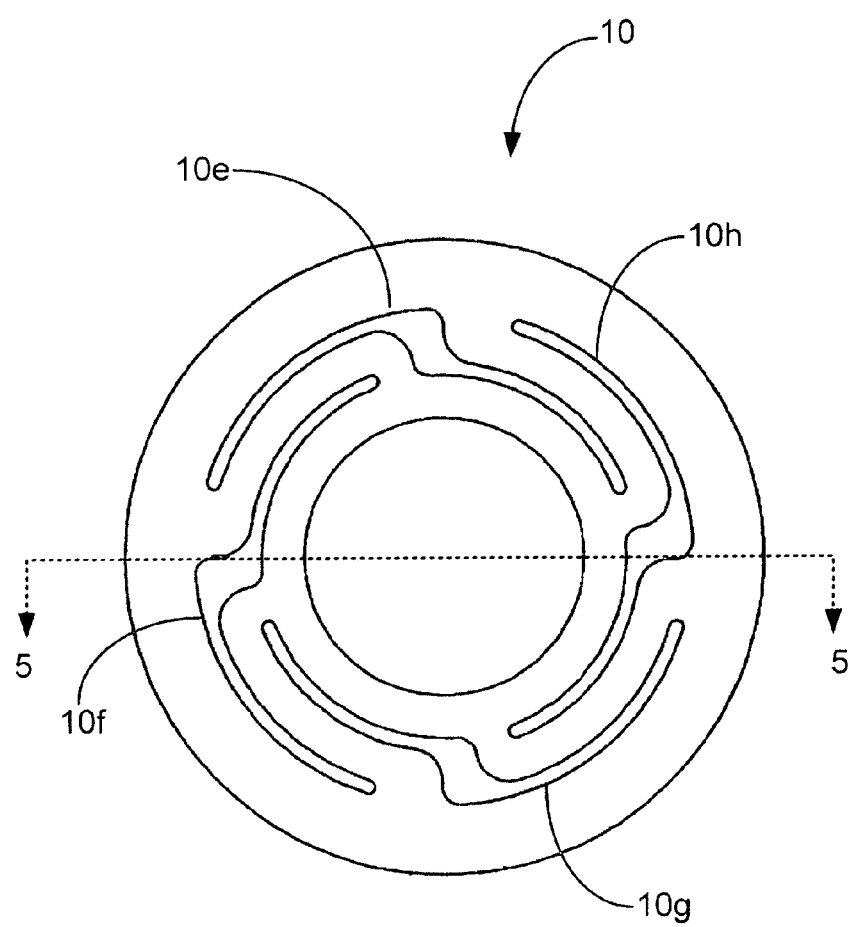
FIG. 4 is a top view of a circular flat spring of the proportional solenoid control valve.
Figure 5:
FIG. 5 is a vertical cross sectional view of a circular flat of the proportional solenoid control valve.

FIG. 4 shows a top view of the circular flat square spring 10 with a constant distance between supporting points, while FIG. 5 shows a cross sectional view of the same.

The flat square spring 10 has four outer peripheral tabs and four cutouts each provided at an inner side of a corner section so that the width of spring section is made to be a substantially uniform width. Thus, a wider stroke width is obtained within a range for maintaining the elastic coefficient of the spring.

Referring to FIG. 1, when the solenoid coil 15 is magnetized, magnetic force passes through the magnetic rod 17, circular magnetic nut 19, magnetic washer A18, magnetic yoke 14, magnetic washer B 12 and plunger 11 and passes through the magnetic gap 20. Thus, a magnetic path is constructed. The magnetic path is illustrated with arrows in FIG. 1.

The magnetic flux generates an attraction force between the plunger 11 and the magnetic rod 17 so that the plunger 11 is moved towards the magnetic rod 17.

The valve opening is determined based upon the position of the plunger 11 at which the attraction force and the repulsive force of the flat square spring 10 are balanced to one another, thus the flow rate of fluid is controlled.

When the current supplied to the solenoid coil 15 is increased, the flow rate of fluid is increased proportionally. On the contrary, when the current supplied to the solenoid coil 15 is decreased, the flow rate of fluid is decreased proportionally.

Referring to FIG. 2, the flat square spring 10 has four outer peripheral tabs 10a–10d and has cutouts 10e–10h each being provided at each annular inner corner among four annular inner corners, so that the spring width is made to be a substantially uniform width. Thus, wide homogenization in deformation is intended, and metal fatigue fracture point of the spring is raised. And, the change in flow rate due to vibration by supporting point friction is suppressed to a minimum by applying low friction TEFLON coating on one supporting point side face.

Referring to FIG. 4, the circular flat spring 10 has an arrangement that cutouts 10e–10h are formed at four points along an inner periphery thereof so as not to change the distance between the supporting points even when the controlling voltage has changed. Each of the cutouts 10e–10h are formed in a substantially spiral shape. The spiral shape includes an outer arc shape, an inner arc shape and a straight shape for connecting the outer and inner arc shapes. Therefore, change in flow rate due to the supporting point friction is not generated.

The spring constant of the flat spring 10 is extremely greater than the spring constant of the resilient rubber 5.

What is claimed is:

1. A proportional solenoid control valve comprising:

a solenoid;

a magnetic movable member having a magnetic attraction force applied by the solenoid; and a flat spring for engaging an outer periphery section of the flat spring with a non-magnetic cylindrical member for guiding the magnetic movable member, and for engaging an inner periphery section of the flat spring with the magnetic movable member so as to balance in power with the magnetic movable member due to the magnetic attraction force, the flat spring including a flat square spring which has cutouts at an inner side of four corners thereof so as to obtain uniform deformation displacement, and which is strong and is wide in spring constant maintaining width with respect to the spring displacement, the flat square spring having a PTFE coating on a supporting point side face.

2. A proportional solenoid control valve comprising:

a solenoid;

a magnetic movable member having a magnetic attraction force applied by the solenoid;

a flat spring for engaging an outer periphery section of the flat spring with a non-magnetic cylindrical member for guiding the magnetic movable member, and for engaging an inner periphery section of the flat spring with the magnetic movable member so as to balance in power with the magnetic movable member due to the magnetic attraction force; and a sealing mechanism which compensates dimensional instability by combining a rubber having smaller displacement and smaller hardness and a rubber having greater hardness at a section corresponding to an orifice.

* * * * *